W. E. KERSHAW.
SECONDARY OR STORAGE MULTIVOLT BATTERY.
APPLICATION FILED AUG. 23, 1918.
1,341,469.
Patented May 25, 1920.
2 SHEETS—SHEET 1.
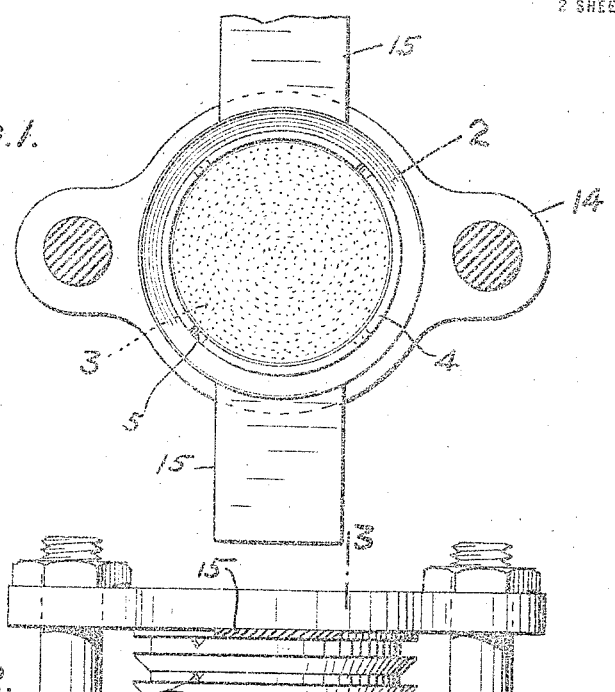
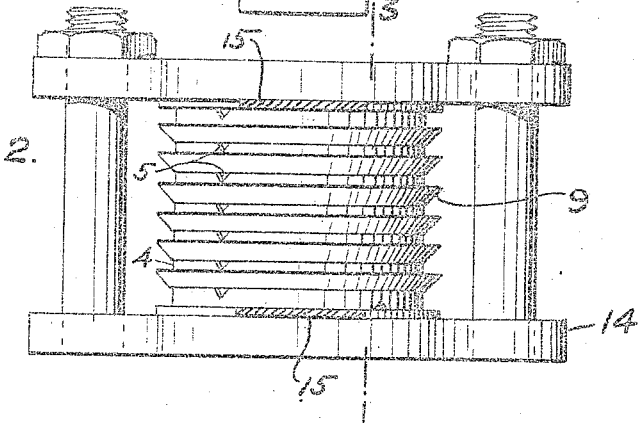
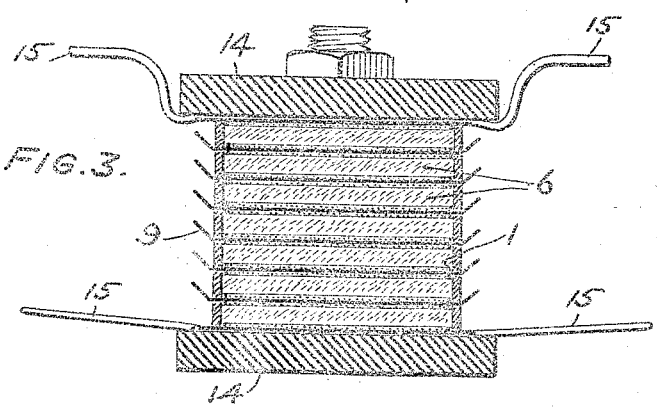
WITNESS:
Rob R Kitchel
INVENTOR
William Ernest Kershaw
BY
Augustus B Stoughton
ATTORNEY W. E. KERSHAW.
SECONDARY OR STORAGE MULTIVOLT BATTERY.
APPLICATION FILED AUG. 23, 1918.
1,341,469.
Patented May 25, 1920.
2 SHEETS—SHEET 2.
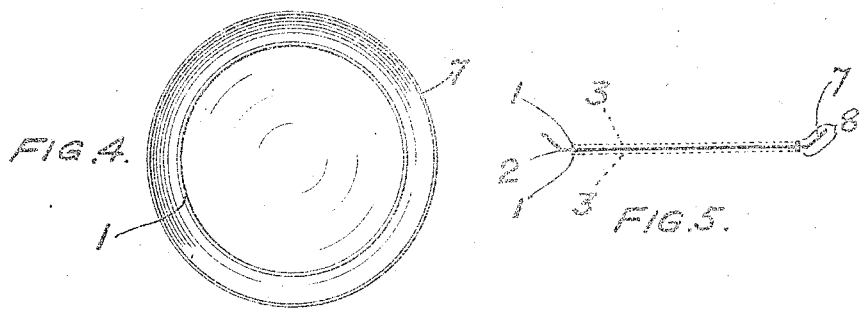
FIG. 4.  FIG. 5.
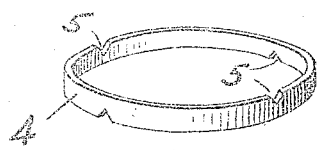
FIG. 6.
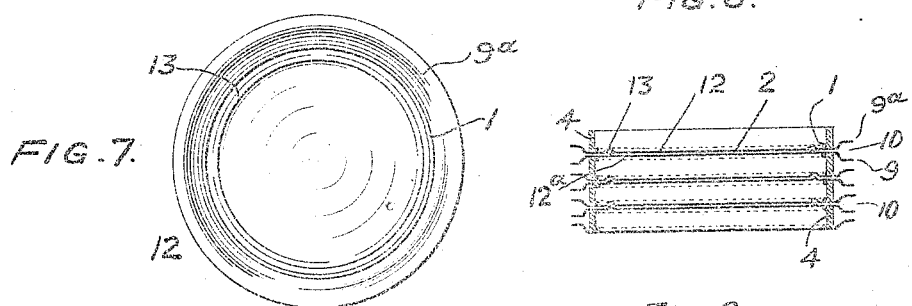
FIG. 7.  FIG. 8.
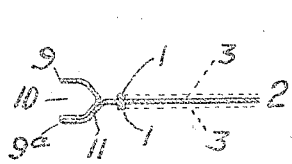 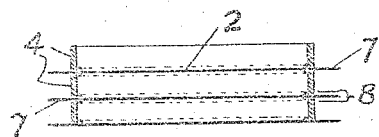
FIG. 9.  FIG. 10.
INVENTOR
William Ernest Kershaw
BY
Augustus B Stoughton
ATTORNEY.
WITNESS:

UNITED STATES PATENT OFFICE.

WILLIAM ERNEST KERSHAW, OF PHILADELPHIA, PENNSYLVANIA.

SECONDARY OR STORAGE MULTIVOLT BATTERY.

1,341,469.  Specification of Letters Patent.  Patented May 25, 1920.

Application filed August 23, 1918. Serial No. 251,045.

*To all whom it may concern:*

Be it known that I, WILLIAM ERNEST KERSHAW, a citizen of the United States, and a resident of Philadelphia, in the county of Philadelphia and State of Pennsylvania, have invented certain new and useful Improvements in Secondary or Storage Multivolt Batteries, of which the following is a specification.

The principal objects of the present invention are, to provide a durable secondary or storage multivolt battery of low internal resistance and high discharge rate and which may be very light in proportion to its high voltage; to provide for properly spacing and alining the elements in the pile; to provide effective insulation for preventing short circuits; to provide for ventilation; to protect the absorbent electrolyte carriers from pressure, and to prevent creeping of the electroylte.

The invention will be claimed at the end hereof, but will be first described in connection with the embodiment of it chosen for the sake of illustration in the accompanying drawings, forming part hereof, and in which—

Figure 1, is a transverse sectional view of a battery embodying features of the invention.

Fig. 2, is a side view of the same, partly in section.

Fig. 3, is a sectional view on the line 3—3 of Fig. 2.

Figs. 4 and 5, are respectively a plan and sectional view of an element support.

Fig. 6, is a perspective view of an insulating spacing ring.

Figs. 7 and 8 are respectively a plan and a sectional view of a modification of the element support.

Fig. 9, is a section of a part of an element support embodying a modification, and Fig. 10, is a section of several element supports embodying another modification, showing also the spacing rings.

In the drawings 1, are ribs on each face of the elements 2, and these ribs confine or surround the active material or material adapted to become active 3. In the case of the elements at the ends of the pile of elements the outside faces of these elements may be devoid of ribs. 4, are spacing and insulating rings, as of hard rubber or other insulating material, and they are interposed between the elements 2 and fit over the ribs 1, of adjoining or confronting elements. These rings 4 may be notched at 5 for the escape of gas and the admission of water or acid. 6, are absorbent electrolyte carriers, as of absorbent paper and they are arranged within the rings 4. The rings 4 not only insure definite separation of the elements 2, but also, by engaging the ribs 1, hold or lock the elements in alinement and in the form of a pile. Moreover the rings 4, keep pressure or weight off the electrolyte carrier 6, and thus allow them to retain the electrolyte. The ribs 1, are formed inside of the edges of the supports, leaving marginal portions 7, of the supports outside of the ribs. To these marginal portions 7 of the supports, an acid resisting coating 8, is applied. This coating may consist of asphalt and rubber paint. The coating 8, prevents acid from creeping and opposes the formation of lead sulfate which would cause evaporation of the electrolyte and give rise to capillary action and possibility of short circuiting. The marginal portions 7, may be dished, as at 9, Figs. 2 and 3, and when this is done it is useful in retaining electrolyte which may be forced out by gas when the battery is charged soon after having been filled with electrolyte fluid. The marginal portion 7 presents an edge which in itself, and whether dished or not dished as in Fig. 10, tends to oppose creeping of the electrolyte, and this opposition may be increased by providing a groove 10, Figs. 8 and 9, so that two edges 9 and 9ª are presented. The groove may be formed in the rim of the support, or the edge portion of the support may be bent to form the groove as shown at 11, Fig. 9, or the support may consist of two superposed reversely dished parts 12, Fig. 8, in electrical contact, as by welding, and in this case each part 12, may be provided with a flange 13 and the flanges 13 by mutual engagement serve to aline the parts during assembly and while they are connected in electrical contact. 14, is a frame, as of hard rubber which serves to hold the assembled pile and 15 are connectors or terminals projecting from the supports of the end elements which, of course, are provided on their inner faces only with active material or material adapted to become active.

Without intending to limit the invention and having regard to one use of it, it may be said that the supports may be of lead and for example, only eleven-thousandths of an inch thick, and there may be, for instance, one hundred and twenty elements, so that the invention can be embodied in a very light and compact battery of high voltage, but of course this is not the only embodiment of the invention.

What I claim is:

1. In a secondary or storage multi-volt battery the combination of ribs on each face of the elements, and spacing rings fitting the ribs of adjoining elements, substantially as described.

2. A secondary or storage multi-volt battery element consisting of a support having a rib on each face inside of the margin, active material or material adapted to become active applied to the support and confined within the ribs, and a dry self supporting coating of paint applied to the marginal portions of the supports outside of the ribs, substantially as described.

3. In a secondary or storage multi-volt battery the combination of elements having facial ribs surrounding the active material or material adapted to become active, electrolyte carriers between said material, and spacing rings encircling and fitting the ribs of adjacent elements and provided with openings, substantially as described.

4. In a secondary or storage multi-volt battery the combination of element supports having facial ribs spaced from the edges and having marginal portions outside of the ribs, active material or material adapted to become active confined by the ribs, spacing and insulating rings receiving and fitting the ribs of adjacent supports, absorbent electrolyte carriers arranged within the rings, and an acid resisting coating applied to the marginal portions of the supports outside of the ribs.

5. In a secondary or storage multi-volt battery the combination of element supports having facial ribs spaced from the edges and having marginal portions outside of the ribs, active material or material adapted to become active confined by the ribs, spacing and insulating rings receiving and fitting the ribs of adjacent supports, absorbent electrolyte carriers arranged within the rings, and an acid resisting coating applied to the marginal portions of the supports outside of the ribs.

WILLIAM ERNEST KERSHAW.